(12) United States Patent
Hütter et al.

(10) Patent No.: US 8,001,299 B2
(45) Date of Patent: Aug. 16, 2011

(54) METHOD FOR THE CONTROL OF NETWORK DEVICES CONNECTED VIA A BUS SYSTEM

(75) Inventors: Ingo Hütter, Pattensen (DE); Thomas Brune, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 1476 days.

(21) Appl. No.: 10/474,022

(22) PCT Filed: Apr. 8, 2002

(86) PCT No.: PCT/EP02/03877
§ 371 (c)(1),
(2), (4) Date: Oct. 6, 2003

(87) PCT Pub. No.: WO02/087162
PCT Pub. Date: Oct. 31, 2002

(65) Prior Publication Data
US 2004/0098513 A1 May 20, 2004

(30) Foreign Application Priority Data
Apr. 24, 2001 (EP) .................................... 01109980

(51) Int. Cl.
*G06F 13/12* (2006.01)
*G05B 11/01* (2006.01)
(52) U.S. Cl. ......................................... 710/62; 715/700
(58) Field of Classification Search .................. 345/700, 345/716, 733, 744–750, 760; 709/203; 710/8, 710/62, 63, 72, 73
See application file for complete search history.

(56) References Cited

U.S. PATENT DOCUMENTS

| | | | |
|---|---|---|---|
| 6,253,114 B1 * | 6/2001 | Takihara | 700/83 |
| 6,434,447 B1 * | 8/2002 | Shteyn | 700/245 |
| 6,700,592 B1 * | 3/2004 | Kou et al. | 715/771 |
| 6,801,507 B1 * | 10/2004 | Humpleman et al. | 370/257 |
| 2001/0038392 A1 * | 11/2001 | Humpleman et al. | 345/733 |
| 2002/0078259 A1 * | 6/2002 | Wendorf et al. | 709/328 |
| 2002/0152311 A1 * | 10/2002 | Veltman et al. | 709/227 |

FOREIGN PATENT DOCUMENTS

| | | |
|---|---|---|
| WO | 00/14927 | 3/2000 |
| WO | 00/26794 | 5/2000 |
| WO | 01/23988 | 4/2001 |

* cited by examiner

*Primary Examiner* — Ilwoo Park
(74) *Attorney, Agent, or Firm* — Jeffrey D. Carter

(57) ABSTRACT

Two or more electronic devices are connected via a bus system, wherein one of the network devices controls other network devices. A first control application is uploaded from a first controlled device to the control device and a second control application is uploaded from a second controlled device into the first control application. The first and second controlled devices can be operated simultaneously using a single user interface shown on a display of the control device. The user interface of the first device is displayed as main user interface and the user interface of the second device is rendered within the main interface as reduced user interface, which includes only operation elements necessary for operation of the second device in combination with the first device. The generation of combined user interfaces is also possible when the second controlled device comprises features, which are not known at the production of the first controlled device.

10 Claims, 1 Drawing Sheet

METHOD FOR THE CONTROL OF NETWORK DEVICES CONNECTED VIA A BUS SYSTEM

Figure 1:
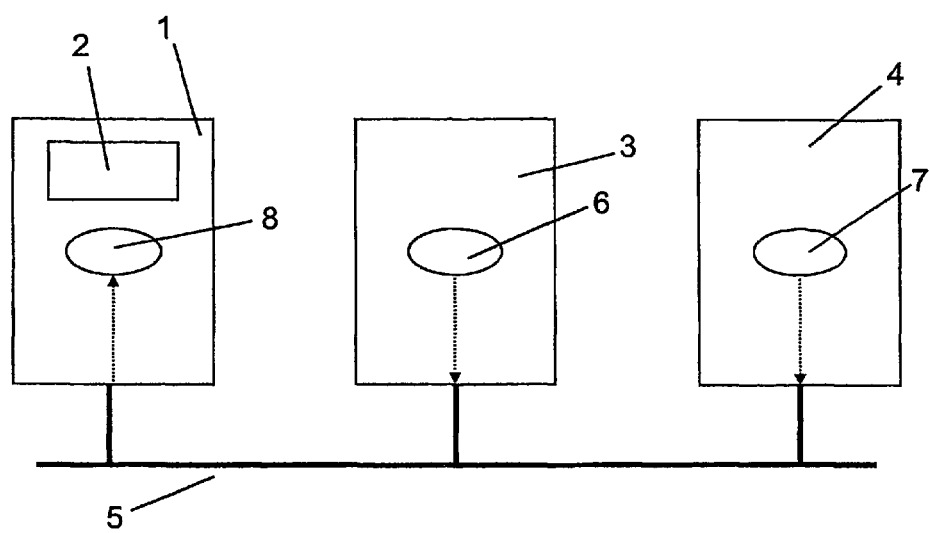

This application claims the benefit, under 35 U.S.C. §365 of International Application PCT/EP02/03877, filed Apr. 8, 2002, which was published in accordance with PCT Article 21(2) on Oct. 31, 2002 in English and which claims the benefit of European patent application No. 01109980.1, filed Apr. 24, 2001.

The invention relates to a method for the control of network devices connected via a bus system, especially to AV devices within a network of home entertainment products.

BACKGROUND

For controlling several AV devices within a network of home entertainment products the so-called HAVi (Home Audio Video Interoperability) standard has been developed. This standard specifies the control of television sets, video recorders, set top boxes and other devices, especially for the control of the exchange of digital audio and video streams. The devices are connected via the IEEE 1394 bus (i.LINK® or Fire-Wire®), which has enough capacity to simultaneously carry multiple digital audio and video streams.

Each device added to the HAVi network automatically installs its own application and interface software and is automatically registered by the system so that other devices know what it is capable of. So-called Application Programming Interfaces of the most common AV functions have been standardized. Furthermore, functions on a device within the HAVi networking system may be controlled from another device within the system.

HAVi defines two different ways of using User-Interfaces (UIs). Both solutions are working in principle in the same way: one device within the network (target) provides UI-elements or a kind of a complete UI to a display device (controller). The controller renders the UI-elements or executes the complete UI, respectively. The first mode or level is called Data Driven Interaction (DDI), the second one UI by Havlets. Havlet is an artificial word created from "HAVi" and "applet" which shall clarify that as for applets for Internet applications software is uploaded from a first device to a second device on which it is executed.

For a UI by Havlets a Java UI is uploaded from the controlled device to the controller, which hosts a Java Virtual machine. The Java Virtual machine runs the Havlets and generates in this way the user interfaces to be displayed.

Although UI by Havlets allows high flexibility for the construction of user interfaces, it shows a lack in setting up a service between two IEEE1394 devices, as the user has to handle two separate UIs.

INVENTION

It is one object of the invention to disclose a method for the control of network devices connected via a bus system, which allows a simple simultaneous operation of two or more devices. This object is achieved by the method disclosed in claim 1.

In principle, according to the inventive method one of the network devices controls other network devices and a control application is uploaded from the controlled device to the control device and is run on the control device in order to provide an user interface for the controlled device. A first control application is uploaded from a first controlled device to the control device and a second control application is uploaded from a second controlled device into the first control application.

This is especially advantageous for the generation of combined user interfaces when the second controlled device that is controlled via the first controlled device comprises features to be controlled, which are not known at the production of the first controlled device.

Advantageous additional embodiments of the inventive method are disclosed in the respective dependent claims.

DRAWING

Embodiments of the invention are described with reference to the FIGURE, which shows a part of a network, which is controlled according to the invention.

EXEMPLARY EMBODIMENTS

FIG. 1 shows a part of a network of AV devices, which are controlled according to the invention. A display device 1 with display 2, a first controlled device 3 and a second controlled device 4 are connected via an IEEE 1394 bus 5. Device Control Modules (DCMs) 6 and 7 for the first and second controlled devices 3 and 4 translate the HAVi commands into device specific commands for the control of the first and second controlled device, respectively. The DCMs provide the API to control the respective device, by commands sent to its DCM. Each active device in the network is represented by one DCM, wherein the DCMs can be physically located on the same device or on other devices. In this case the DCMs 6 and 7 are located at the respective controlled devices 3 and 4.

For the download and processing of Havlets a Java Virtual machine 8 implemented on at least one device within the HAVi network is necessary. In this case the Java Virtual machine 8 is implemented on the display device 1. By running a Havlet on the Java Virtual machine 8 the UI-elements for the device to be controlled are generated and displayed to the user. Similarly, the user's action is translated to commands sent to the DCM of the controlled device.

For the display of a graphical user interface for the first controlled device 3 a corresponding Havlet is uploaded from the DCM 6 of the first controlled device 3 to the Java Virtual machine 8 located at the display device 1. The Java Virtual machine 8 runs this Havlet and generates the user interface, which comprises several elements for the control of this target device. In addition, a list of source or sink devices can be displayed, wherein a source device means a device which is able to deliver a data stream and a sink device means a device able to receive a data stream. A device can be a source and a sink device simultaneously, e.g. a VCR which can playback and record a data stream.

If a second controlled device 4 is selected as a source or sink device, the DCM 7 for the second controlled device 4 is requested to provide data for a corresponding "Mini-Havlet" for the generation of a reduced user interface for the second controlled device. This "Mini-Havlet" is run by the Java Virtual machine 8 in order to insert the reduced user interface into the user interface for the first controlled device. An example for the generation of such a combined user interface using Havlets is described in the following.

Initially, the user sitting in front of a television set selects the camcorder on the television screen, e.g. by clicking on an icon representing the camcorder. As a result the user is provided with the main panel for controlling the camcorder.

Due to a registry scan performed by the Havlet running on the controller device, the Havlet is able to find possible sink and source devices within the network for the camcorder. So the Havlet is also able to render a/two choice lists of sink/source devices. Two separate lists can be displayed, wherein the first list comprises sink devices and the second list comprises source devices. Also a combined list can be displayed which comprises sink devices and source devices. The sink/source devices can be listed in text form or can be displayed by corresponding icons. The list(s) can also comprise further details of the sink/source devices. So the kind of data streams processable by the devices can be displayed, e.g. source device for MPEG 2 audio and video signals.

When selecting, for example, a digital VCR as a sink device from the list, the HAVi-stream-setup between the camcorder and the digital VCR will be initiated by the Havlet. In addition the sink device's DCM (VCR) will provide a reduced user interface ("Mini-Havlet"), which is rendered within the main (camcorder) Havlet and comprises only the elements of the VCR which are necessary for operation as a sink device, e.g. "record", "play", "pause", "forward", "rewind".

The "Mini-Havlet" representing the second controlled device will provide a HContainer object (containing all control buttons etc.) to the Havlet of the first controlled device. This Havlet had reserved some space, which is used to display the HContainer of the "Mini-Havlet".

For the sake of simplicity the foregoing example describes the interaction of two devices with well known-features. However, the invention is especially advantageous for the generation of combined user interfaces of devices with future features, as it allows controlling a future device via a present device although this present device cannot have the knowledge of the unknown future features.

The invention can be used for the simultaneous operation of two or more bus connected electronic devices, especially of two or more HAVi devices connected via IEEE1394 bus.

The invention claimed is:

1. Method for controlling network devices connected by a bus system, wherein a control device controls other network devices, comprising:
    loading a first control application from a first network device to the control device;
    running the first control application on the control device in order to provide a user interface for the first network device;
    running the first control application to render a choice list of sink/source devices in the user interface of the first network device;
    loading a second control application from a second network device to the control device in case of selecting said second network device from said choice list;
    running the second control application on the control device; and
    inserting a reduced user interface for the second network device into the user interface for the first network device.

2. Method according to claim 1, wherein control features or control commands for the second network device are supplied to the second network device.

3. Method according to claim 2, wherein the first network device and the second network device are simultaneously controlled.

4. Method according to claim 1, wherein the network comprises several AV devices, which are controlled using the HAVi standard and wherein the control applications are Havlets or reduced Havlets for the generation of a reduced user interface, which are uploaded from a DCM of the respective network device.

5. Method according to claim 4, wherein a first network device runs a first Havlet for the control of the first network device and the Havlet is able to download a second reduced Havlet for the generation of a reduced user interlace from the DCM of a second network device which is started by the first Havlet to control the second network device.

6. Method according to claim 5, wherein the second reduced Havlet comprises only the control features or control commands for control of the second network device.

7. Method according to claim 6, wherein a graphical representation of the second controlled device is supplied from the second reduced Havlets for the generation of a reduced user interlace to the first Havlet and is inserted into the graphical user interface of the Havlet for the first network device.

8. Method according to claim 4, wherein user commands directed to the inserted graphical user interface for the second network device are only received by the second reduced Havlets for the generation of a reduced user interface and are directly transmitted to the second network device.

9. Device for simultaneously controlling network devices connected via a bus system, comprising:
    means for loading a first control application from a first network device into a control device;
    means for running the first control application in order to provide a user interface for the first network device;
    means for rendering a choice list of sink/source devices in the user interface of the first network device using the first control application;
    means for loading a second control application from a second network device in case of selecting said second network device from said choice list;
    means for running the second control application; and
    means for inserting a reduced user interface for the second network device into the user interlace for the first network device.

10. Method for controlling network devices connected by a bus system, wherein a control device controls other network devices, comprising:
    first, loading a first control application from a first network device to the control device;
    second, running the first control application on the control device in order to provide a user interface for control of the first network device;
    third, rendering a choice list of sink/source devices in the user interface of the first network device;
    fourth, loading a second control application from a second network device to the control device in case of selecting said second network device from said choice list;
    fifth, running the second control application on the control device; and
    sixth, inserting a reduced user interface for control of the second network device into the user interface for the first network device.

* * * * *